M. S. DANNER.
LARD PADDLE.
APPLICATION FILED JUNE 4, 1914.

1,196,526.

Patented Aug. 29, 1916.

WITNESSES

INVENTOR
Milton S. Danner
BY
ATTORNEYS

UNITED STATES PATENT OFFICE.

MILTON STEVENS DANNER, OF TUSKEGEE, ALABAMA.

LARD-PADDLE.

1,196,526.     Specification of Letters Patent.     Patented Aug. 29, 1916.

Application filed June 4, 1914. Serial No. 842,944.

*To all whom it may concern:*

Be it known that I, MILTON S. DANNER, a citizen of the United States, and a resident of Tuskegee, in the county of Macon and State of Alabama, have invented a new and Improved Lard-Paddle, of which the following is a full, clear, and exact description.

My invention relates particularly to a device for use by retail grocers in taking lard from tubs or barrels containing the same.

In removing a quantity of lard on a paddle, the lard has a great tendency to slip from the paddle or blade usually employed, and the prime advantage of my invention is to provide a device which will separate a portion of the lard by direct insertion into the mass, and will retain the same on the blade so that the lard may be readily lifted without slipping.

The invention also has for its object to so form the blade as to provide for the proper scraping of the curved sides of the tub or barrel.

In carrying out the invention the body of the blade is made substantially straight for nearly its whole length, while the front is upturned in the form of a curved lip, which acts as a retainer for the lard, and enables the handler of the device to readily lift the lard from the tub without its slipping. The side edges of the blade adjacent to the front end and at the sides of the curved lip are sharpened to readily cut the lard, and the upper edge of the lip is made oval to effectively scrape the curved sides of the tub or barrel. The blade is provided with a handle at the end opposite the curved lip and such handle is arranged in a plane above the edge of the curved lip and at an angle to the blade to compensate the tendency to throw the blade out of a direct cut and also to provide means for rocking the curved lip forward in the cut made by the knife under the mass so that the same may be lifted upward.

The invention will be particularly explained in the specific description following.

Reference is to be had to the accompanying drawings forming a part of this specification, in which similar characters of reference indicate corresponding parts in all the views.

Figure 1:
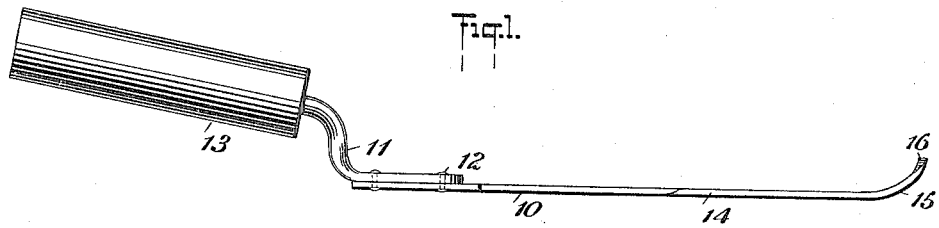
Figure 2:
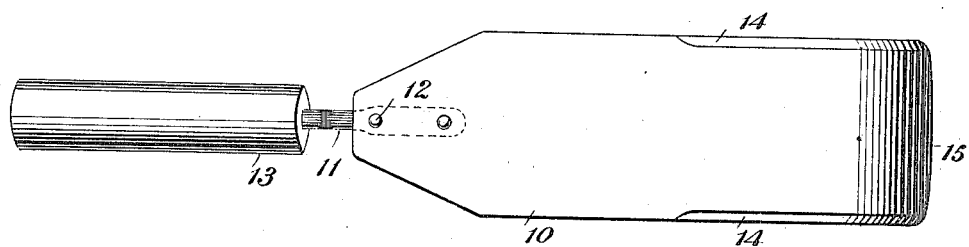
Figure 3:
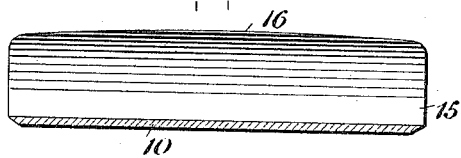

Figure 1 is a side elevation of a lard paddle formed in accordance with my invention; Fig. 2 is an inverted plan view of the paddle; and Fig. 3 is a transverse vertical section through the blade and looking toward the front end.

In forming a paddle in accordance with my invention, the blade 10 is made flat from the rear end to near the front end, and the sides of the blade for a portion of its length are formed with beveled edges 14. The front end is upturned on curved lines to provide a lip 15, which thus forms the front terminal of the blade, while leaving the body flat for substantially its whole length. The top edge 16 of the lip 15 is slightly curved from side to side, the beveled edges 14 extending partially up the sides of the upturned lip 15.

The blade 10 is provided with a handle preferably by securing a tang 11 to the rear end of the blade, which may be done by rivets 12, and a suitable handle may be secured to the said tang. This handle is preferably arranged in a different plane from the upper edge 16 of the upturned lip of the blade and at an angle to the blade 10.

With the described construction, a portion of the lard may be readily severed and will be of approximately uniform thickness, and the lip 15 will serve to effectively retain the separated lard on the blade. A plain flat blade will not retain the lard, and a blade essentially in longitudinally curved form throughout, does not enable the handler of the device to reasonably gage varying quantities by cutting the lard at different depths. The provision of the edges 14, 16, also contributes to the efficiency of the device, in that the essentially flat blade may slice off a quantity of lard of approximately uniform thickness, and at the same time the edge 16 of the lip 15 may be used to scrape the sides of the receptacle. Furthermore, the beveling of a portion of the blade and of a portion of the upturned lip and the arrangement of the handle in a different plane from the upper edge of the upturned lip and at an angle to the body of the blade permits a direct insertion of the device into the body of the material and the withdrawal of a quantity of the material by moving the handle toward the normal plane of the blade thereby moving the lip portion into the body of the material.

Having thus described my invention, I claim as new and desire to secure by Letters Patent:

A lard paddle, comprising a handle, and an elongated blade extending in flat form from the handle end to near the front, said front end being in the form of an upturned curved lip rising slightly above the plane of the flat portion and forming a comparatively small part of the total length of the blade, said lip terminating in an edge curved from side to side, the blade furthermore having knife edges at each side extending from points rearward of the lip forwardly and following the lines of said lip, the flat portion of the blade presenting straight side edges from the heel thereof forwardly along their full length whereby to be disposed parallel with the straight up and down lines of a lard firkin.

In testimony whereof I have signed my name to this specification, in the presence of two subscribing witnesses.

MILTON STEVENS DANNER.

Witnesses:
CRAWFORD MOTLEY,
O. S. LEWIS.

Copies of this patent may be obtained for five cents each, by addressing the "Commissioner of Patents, Washington, D. C."